US012645428B1

(12) United States Patent
Tang

(10) Patent No.: US 12,645,428 B1
(45) Date of Patent: Jun. 2, 2026

(54) PARTIALLY INTERRUPTING A WRITE COMMUNICATION CHANNEL WITH A HARDWARE MEMORY BARRIER DEVICE

(71) Applicant: Microsoft Technology Licensing, LLC, Redmond, WA (US)

(72) Inventor: Monica Man Kay Tang, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/981,016

(22) Filed: Dec. 13, 2024

(51) Int. Cl.
| | |
|---|---|
| *G06F 3/06* | (2006.01) |
| *G06F 7/78* | (2006.01) |
| *G06F 13/42* | (2006.01) |

(52) U.S. Cl.
CPC ................ *G06F 7/78* (2013.01); *G06F 13/42* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 9,916,269 B1 * | 3/2018 | Machulsky | ......... | G06F 13/4068 |
| 2012/0290752 A1 | 11/2012 | Lim | | |
| 2017/0344367 A1 * | 11/2017 | Beard | ................. | G06F 12/0875 |

FOREIGN PATENT DOCUMENTS

| | | | | |
|---|---|---|---|---|
| EP | 3961403 A1 * | 3/2022 | .......... | G06F 11/0745 |

OTHER PUBLICATIONS

"Amba AXI protocol V1.0 specification", Retrieved from URL: http://www.arm.com/products/solutions/axi_spec.html, 2003, 108 Pages.
International Search Report and Written Opinion received for PCT Application No. PCT/US2025/050767, mailed on Jan. 26, 2026, 15 pages.

* cited by examiner

*Primary Examiner* — Brian R Peugh

(57) ABSTRACT
One example provides a computing device comprising a write communication channel and an initiator device connected to the write communication channel. The initiator device has ordering rules for the write communication channel. Further, a network on a chip (NoC) device is connected to the write communication channel. The NoC device includes a reorder buffer. The computing device also comprises a hardware memory barrier (HMB) device connected to the write communication channel such that at least a portion of the write communication channel is routed through the HMB device.

20 Claims, 7 Drawing Sheets

6/7

600

602 — OPERATE HMB DEVICE IN DEACTIVATED STATE

604 — RECEIVE FIRST HANDSHAKE INPUT AND TRANSMIT FIRST HANDSHAKE INPUT TO INITIATOR DEVICE

606A — MAINTAIN COUNT OF OUTSTANDING TRANSACTIONS

608 — CHANGE TO ACTIVATED STATE IN RESPONSE TO HMB ADDRESS

610 — OPERATE HMB DEVICE IN ACTIVATED STATE

612 — RECEIVE SECOND HANDSHAKE INPUT

614 — RECEIVE REQUEST READY INPUT FROM NOC DEVICE

606B — MAINTAIN COUNT OF OUTSTANDING TRANSACTIONS

616 — INTERRUPT SECOND HANDSHAKE INPUT TO INITIATOR DEVICE

618 — DETERMINE THAT COUNT IS GREATER THAN ZERO

620 — SEND DE-ASSERT REQUEST READY INPUT

622 — CHANGE TO DEACTIVATED STATE

624 — IN RESPONSE TO DETERMINING THAT COUNT IS ZERO

626 — SEND ASSERTED REQUEST READY INPUT TO INITIATOR DEVICE

FIG. 6A

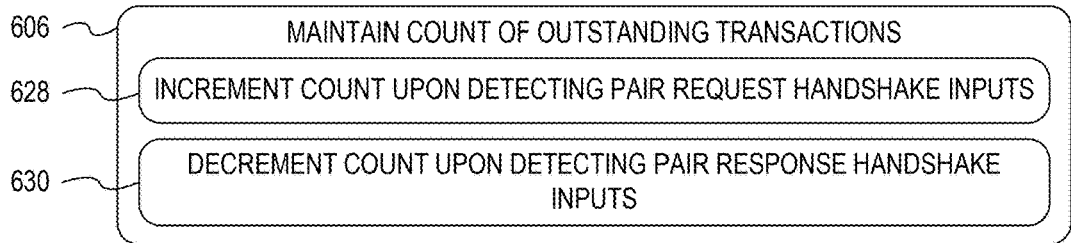

606 — MAINTAIN COUNT OF OUTSTANDING TRANSACTIONS

628 — INCREMENT COUNT UPON DETECTING PAIR REQUEST HANDSHAKE INPUTS

630 — DECREMENT COUNT UPON DETECTING PAIR RESPONSE HANDSHAKE INPUTS

FIG. 6B

PARTIALLY INTERRUPTING A WRITE COMMUNICATION CHANNEL WITH A HARDWARE MEMORY BARRIER DEVICE

BACKGROUND

Some computing devices may share a memory device across multiple internal compute resources. In such a computing device, a host processor may transfer data to the memory device and then activate an indication to inform other compute resources on the computing device that the data transfer has completed. This indication is referred to as a doorbell. Once the doorbell has been activated, the other compute resources can access the data transferred into the memory device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a computing device comprising a write communication channel and an initiator device connected to the write communication channel. The initiator device has ordering rules for the write communication channel. Further, a network on a chip (NoC) device is connected to the write communication channel. The NoC device includes a reorder buffer. The computing device also comprises a hardware memory barrier (HMB) device connected to the write communication channel such that at least a portion of the write communication channel is routed through the HMB device.

BRIEF DESCRIPTION OF THE DRAWINGS

FIGS. 6A and 6B illustrates a flowchart of an example method for operating an HMB device.

DETAILED DESCRIPTION

Figure 1:
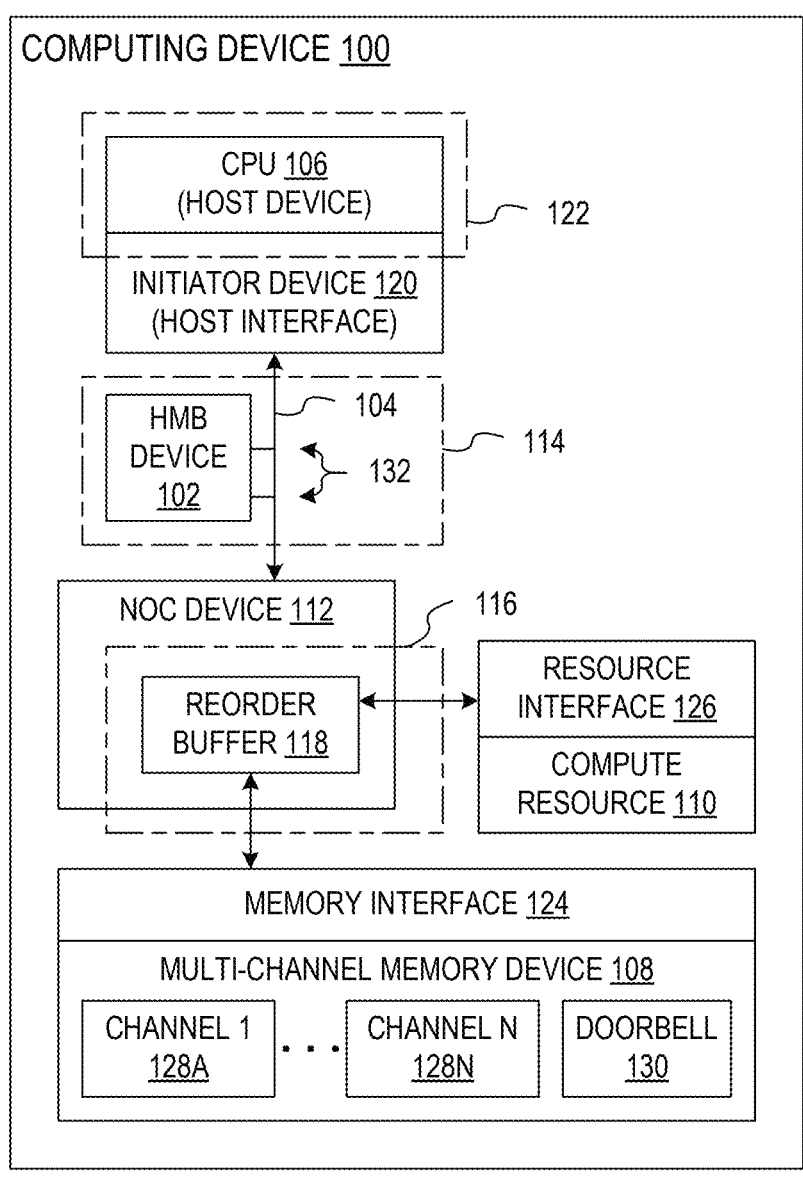
FIG. 1 shows a block diagram of an example computing device comprising a hardware memory barrier (HMB) device.

As mentioned above, a computing device may activate a doorbell after a data transfer to a memory device on the computing device. This doorbell communicates to compute resources on the computing device that the data has been transferred and is ready to be accessed.

Some computing devices may perform hundreds of write transactions in one data transfer. Such a sequence of write transactions along with a sequence of read transactions may consume significant bandwidth to the memory device. Additionally, more than one computing device may access the same memory device concurrently. As such, the computing device may utilize a multi-channel memory device to help parallelize one or more of the write transactions and/or read transactions. For example, the computing device may interleave memory channels to allow highly concurrent data traffic into the multi-channel memory device. Such highly concurrent data traffic can enable high memory bandwidth for a data transfer and may increase performance over serial data traffic into memory.

However, the sequence of write transactions may be reordered within the computing device, for example, by an on-device communication fabric. This may result in a doorbell write transaction not being completed at the end of a sequence of write transactions. Further, the doorbell write transaction may activate the doorbell with outstanding transactions in the sequence of write transactions. This can result in a compute resource accessing an incomplete data transfer, and thus corrupted data.

One possible solution is for the host processor to issue a blocking read transaction between the doorbell write transaction and the rest of the sequence of write transactions. Such a blocking read transaction can force the host processor to wait for the read transaction to return before issuing the doorbell write transaction. However, waiting for the read transaction to return incurs a host-to-memory round trip latency, resulting in a delay before the transferred data can be safely consumed from the multi-channel memory device.

Accordingly, examples are disclosed that relate to interrupting at least a portion of a write communication channel with a hardware memory barrier (HMB) device. Briefly, the write communication channel connects an initiator device and a network-on-chip (NoC) device on a computing device. The HMB device is connected to the write communication channel such that at least a portion of the write communication channel is routed through the HMB device. Additionally, the HMB device is configured to interrupt, in an activated state, at least one handshake input to the initiator device. This can control the initiator device to wait before issuing a subsequent write transaction in accordance with ordering rules for the write communication channel. As will be discussed in more detail, the HMB device interrupts the handshake input based upon a count of outstanding transactions on the write communication channel.

The HMB device is further configured to change to the activated state in response to detecting an HMB address on the write communication channel. This enables the initiator device to selectively activate the HMB device by issuing an HMB write transaction having the HMB address. For example, the initiator device can issue a sequence of write transactions ending in the HMB write transaction and a doorbell write transaction over the write communication channel. Here, the HMB device maintains the order of the doorbell write transaction at the end of the sequence of write transactions. Therefore, the HMB device provides a memory barrier for the doorbell write transaction at the end of the sequence without incurring a round-trip latency of a blocking read transaction.

FIG. 1 shows a block diagram of an example computing device 100 comprising a hardware memory barrier (HMB) device 102 connected to a write communication channel 104. Briefly, the computing device 100 is in the form of a system-on-chip (SoC) having a plurality of functional modules across one or more silicon dies. Further, The SoC can include one or more communication subsystems to connect, control, and interface between the plurality of functional modules.

More particularly, the computing device 100 comprises a host device in the form of a CPU 106 (central processing unit), a multi-channel memory device 108, and a compute resource 110 as functional modules. In various examples, the compute resource 110 can include a suitable memory device, a graphics processing unit (GPU), a secondary CPU, a suitable input-output module, or another suitable functional module. In other examples, the computing device 100 may comprise additional compute resources and/or multi-channel memory devices.

Additionally, the computing device 100 comprises a network-on-chip (NoC) device 112 as a communication subsystem. Such a configuration enables communication between the CPU 106, the compute resource 110, and the multi-channel memory device 108, for example, to share data through the multi-channel memory device 108. More particularly, the NoC device 112 exchanges write transactions on the write communication channel 104 in a first communication domain 114 to a second communication domain 116. Here, the NoC device 112 includes a reorder buffer 118 connected to the second communication domain 116 for controlling data traffic. For example, the reorder buffer 118 can parallelize and/or redirect write transactions to address possible traffic congestion in the second communication domain 116 and/or at the multi-channel memory device 108. Such parallelizing of the data traffic allows concurrent write transactions into the multi-channel memory device 108. This can help to achieve high memory bandwidth for the computing device 100 compared to data throughput with serial transactions. In other examples, the computing device 100 may also include one or more additional NoC devices connected between the NoC device 112 and the multi-channel memory device 108.

The computing device 100 also includes an initiator device 120 coupled to the CPU 106. In various examples, the CPU 106 can be directly coupled to the initiator device 120, coupled through interface wires, or in another suitable manner. In some such examples, the CPU 106 and the initiator device 120 can be coupled with peripheral component interconnect express (PCIe) wires. In other examples, the computing device 100 may be coupled to another computing device through the CPU 106. This enables the other computing device to access the multi-channel memory device 108. In some such examples, the computing device 100 and the other computing device can be coupled in any suitable manner, including with a PCIe interface.

The initiator device 120 is further connected to the write communication channel 104 and has ordering rules for the write communication channel 104. These ordering rules are configured to comply with a suitable on-chip communication protocol, such as an Advanced eXtensible Interface (AXI) protocol by Arm Holdings of Cambridge, England. Other examples of suitable communication protocols include open core protocols (OCP), advanced peripheral bus (APB) protocols, advanced high-performance bus (AHB) protocols, AXI coherency extensions (ACE) protocols, and coherent hub interface (CHI) protocols.

The initiator device 120 also acts as a host interface for the CPU 106 that exchanges transactions between a third communication domain 122 on the CPU 106 and the write communication channel 104 in the first communication domain 114. For example, the third communication domain 122 is configured to comply with a PCIe protocol when the CPU 106 and the initiator device 120 are coupled with PCIe wires. In other examples, another suitable communication protocol can be used for the third communication domain 122. Likewise, a memory interface 124 couples the multi-channel memory device 108 to the second communication domain 116. Similarly, a resource interface 126 couples the compute resource 110 to the second communication domain 116.

The multi-channel memory device 108 comprises a plurality of memory channels 128A-128N. Each memory channel 128 is configured to operate in parallel and thus, can concurrently receive different write transactions. Such a configuration helps to increase a rate of a data transfer into the multi-channel memory device 108 compared to a serial data rate. In various examples, the multi-channel memory device 108 can include HBM memory (high bandwidth memory) by Joint Electron Device Engineering Council (JEDEC) of Arlington County, Virgina, U.S.A., DDR memory (double data rate) by JEDEC, or suitable SRAM memory (static random access memory) with many memory banks.

In the depicted configuration, the CPU 106 can issue a write transaction for the multi-channel memory device 108. Here, the initiator device 120 transfers the write transaction from the CPU 106 to the write communication channel 104. The initiator device 120 also exchanges the write transaction from the third communication domain 122 to the first communication domain 114 to comply with respective ordering rules. Further, the NoC device 112 receives and transfers the write transaction to the multi-channel memory device 108 over the second communication domain 116. Here, the multi-channel memory device 108 commits the write transaction and communicates that the write transaction has been committed. Specifically, a write response of the write transaction is propagated back through the NoC device 112, the write communication channel 104, and the initiator device 120 to thereby return to the CPU 106. Thus, the write response transitions through the second, first, and third communication domains 116, 114, 122. An example write transaction is discussed with reference to FIG. 2. While discussed here with reference to a single write transaction, it will be understood that a sequence of write transactions may be issued.

As previously mentioned, the CPU 106 can issue a sequence of write transactions ending with a doorbell write transaction for a data transfer into the multi-channel memory device 108. The doorbell write transaction activates a doorbell 130 to indicate that the data transfer has been completed. Once the doorbell 130 is activated, the compute resource 110 can subsequently access the data transfer in the multi-channel memory device 108. Therefore, the doorbell 130 can enable a software barrier between the sequence of write transactions and subsequent read transaction(s).

However, the reorder buffer 118 may reorder the sequence of write transactions in a manner where the doorbell write transaction is not completed at the end of the sequence. This may result in the initiator device 120 issuing the doorbell write transaction with outstanding transactions on the write communication channel 104. Further, the resulting reordering of the sequence of write transactions may not comply with the ordering rules for the third communication domain 122 on the CPU 106.

Accordingly, the HMB device 102 is connected to the write communication channel 104 such that at least a portion of the write communication channel 104 is routed through the HMB device 102, as indicated by 132. Briefly, the HMB device 102 is configured, in an activated state, to control this portion (132) through the HMB device 102 such that communication from the NoC device 112 is at least partially interrupted to the initiator device 120. As discussed below, such a partially interrupted write communication channel 104 helps to prevent the initiator device 120 from issuing a subsequent write transaction, e.g., the doorbell write transaction. Therefore, the HMB device 102 helps the computing device 100 to comply with the ordering rules of the third and first communication domains 122, 114 without restricting the reorder buffer 118.

The HMB device 102 is also configured to switch to the activated state in response to detecting an HMB address on the write communication channel 104. Such a configuration enables the initiator device 120 to issue an HMB write transaction including the HMB address in order to activate the HMB device 102 and thereby block a doorbell write transaction. An example sequence of write transactions is discussed with reference to FIG. 4. Such blocking of the doorbell write transaction can be performed without issuing a blocking read transaction. For example, the blocking read transaction may incur a round-trip-latency between the CPU 106 and the multi-channel memory device 108 on the order of two to three microseconds. In contrast, the HMB device 102 can block the doorbell write transaction on the order of 500 nanoseconds in some examples. While discussed here with reference to a computing device in the form of a SoC, the HMB device 102 can be used in other suitable computing devices having ordering rules for a write communication channel in other examples. FIG. 1 is illustrative. In further examples, the computing device 100 may have another configuration.

Figure 2:
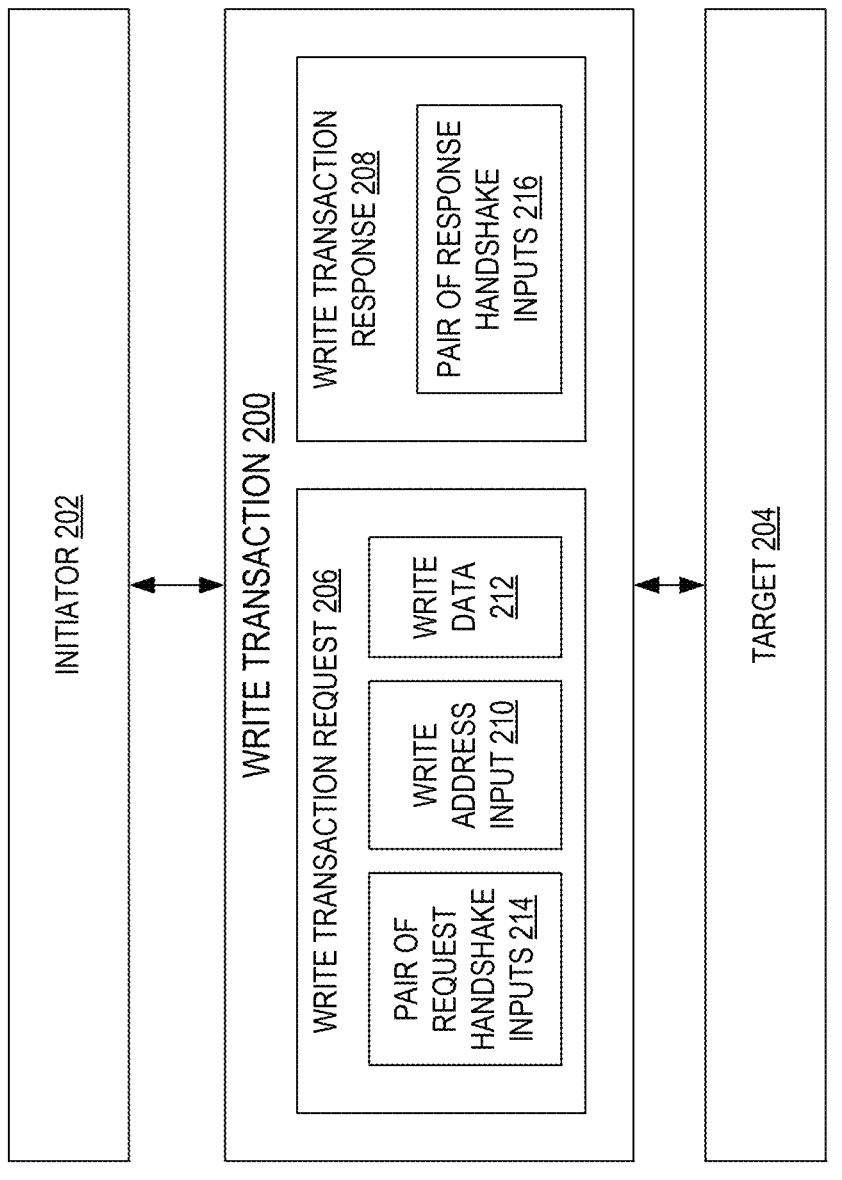
FIG. 2 schematically depicts an example write transaction.

FIG. 2 schematically depicts an example write transaction 200 communicated between an initiator 202 and a target 204. For example, the initiator device 120 and the multi-channel memory device 108 may utilize the write transaction 200. Briefly, the initiator 202 issues a write transaction request 206 to the target 204. After completing the write transaction request 206, the target returns a write transaction response 208.

The write transaction request 206 comprises a write address input 210 indicating a memory location to commit write data 212. The write transaction request 206 also has a pair of request handshake inputs 214 that are exchanged between the initiator 202 and the target 204. In some examples, the pair of request handshake inputs 214 comprises a request valid input and a request ready input. In such examples, the initiator 202 sends the request valid input and the target 204 sends the request ready input to perform a handshake. In other examples, the write transaction request 206 may include additional suitable inputs, such as a data length input, for example. Likewise, the write transaction response 208 has a pair of response handshake inputs 216. Here, the target 204 can send a response valid input, and the initiator 202 correspondingly sends a response ready input.

Additionally, the pair of request handshake inputs 214 and the pair of response handshake inputs 216 can be used to track outstanding write transactions between the initiator 202 and the target 204. Specifically, the write transaction 200 is outstanding after the pair of request handshake inputs 214 are exchanged and before the pair of response handshake inputs 216 are exchanged. FIG. 2 is illustrative. In other examples, a write transaction may have another configuration.

Figure 3:
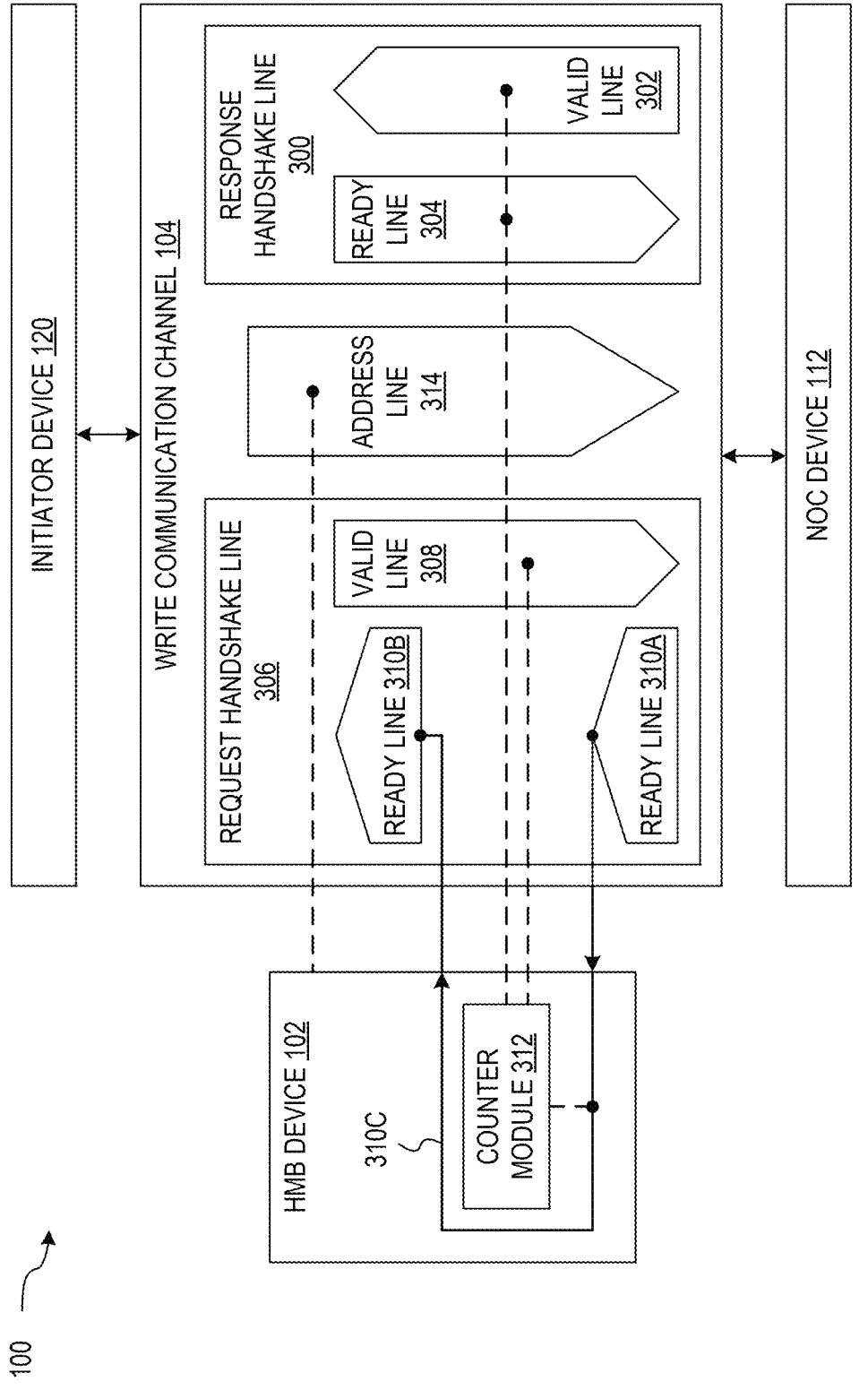
FIG. 3 schematically depicts an example communication diagram for a sequence of write transactions ending with a doorbell write transaction.

FIG. 3 schematically depicts example components for the write communication channel 104 of FIG. 1. In the depicted example, the write communication channel 104 can utilize the write transaction 200 of FIG. 2. As such, the write communication channel 104 comprises a response handshake line 300 for transmitting the pair of response handshake inputs 216. Specifically, the response handshake line 300 includes a response valid line 302 for a response valid input from the NoC device 112. Likewise, a response ready line 304 is included for a response ready input from the initiator device 120.

The write communication channel 104 further comprises a request handshake line 306 for exchanging the pair of request handshake inputs 214. As depicted, a request valid line 308 is included for a request valid input from the initiator device 120. Likewise, a request ready line also is included for a request ready input from the NoC device 112. As can be seen, the request ready line comprises a first portion 310A connecting the NoC device 112 to the HMB device 102 and a second portion 310B connecting the HMB device 102 to the initiator device 120. Additionally, a third portion 310C of the request read line is routed through the HMB device 102. Such a configuration enables the HMB device 102 to control transmission of the request ready input to the initiator device 120 as will be discussed.

The HMB device 102 comprises a counter module 312 connected to the request handshake line 306 and the response handshake line 300. In such a configuration, the counter module 312 can snoop respective input(s) on the request ready line 310, the request valid line 308, the response ready line 304, and the response valid line 302. Further, the counter module 312 is configured to maintain a count of outstanding transactions on the write communication channel 104 based upon detecting the pair of request handshake inputs and/or the pair of response handshake inputs. Further aspects of the counter module 312 are discussed with reference to FIG. 6B.

The write communication channel 104 also includes an address line 314 for transmitting the write address input 210. The address line 314 is also connected to the HMB device 102 thereby allowing the HMB device 102 to snoop for when the write address input 210 includes an HMB address. In some examples, the HMB address may be included in an HMB write transaction, for example, in the form of a dummy write transaction that can be discarded before reaching the multi-channel memory device 108. In response to detecting the HMB address on the address line 314, the HMB device 102 can change to an activated state and interrupt the transmission of the request ready input on the request ready line 310. As a specific example, the HMB device 102 may not transmit the request read input from the NoC device 112 onto the second portion 310B of the request ready line. In other examples, the HMB device 102 may be activated in another suitable manner. FIG. 3 is illustrative. In other examples, a write communication channel may have another configuration.

Figure 4:
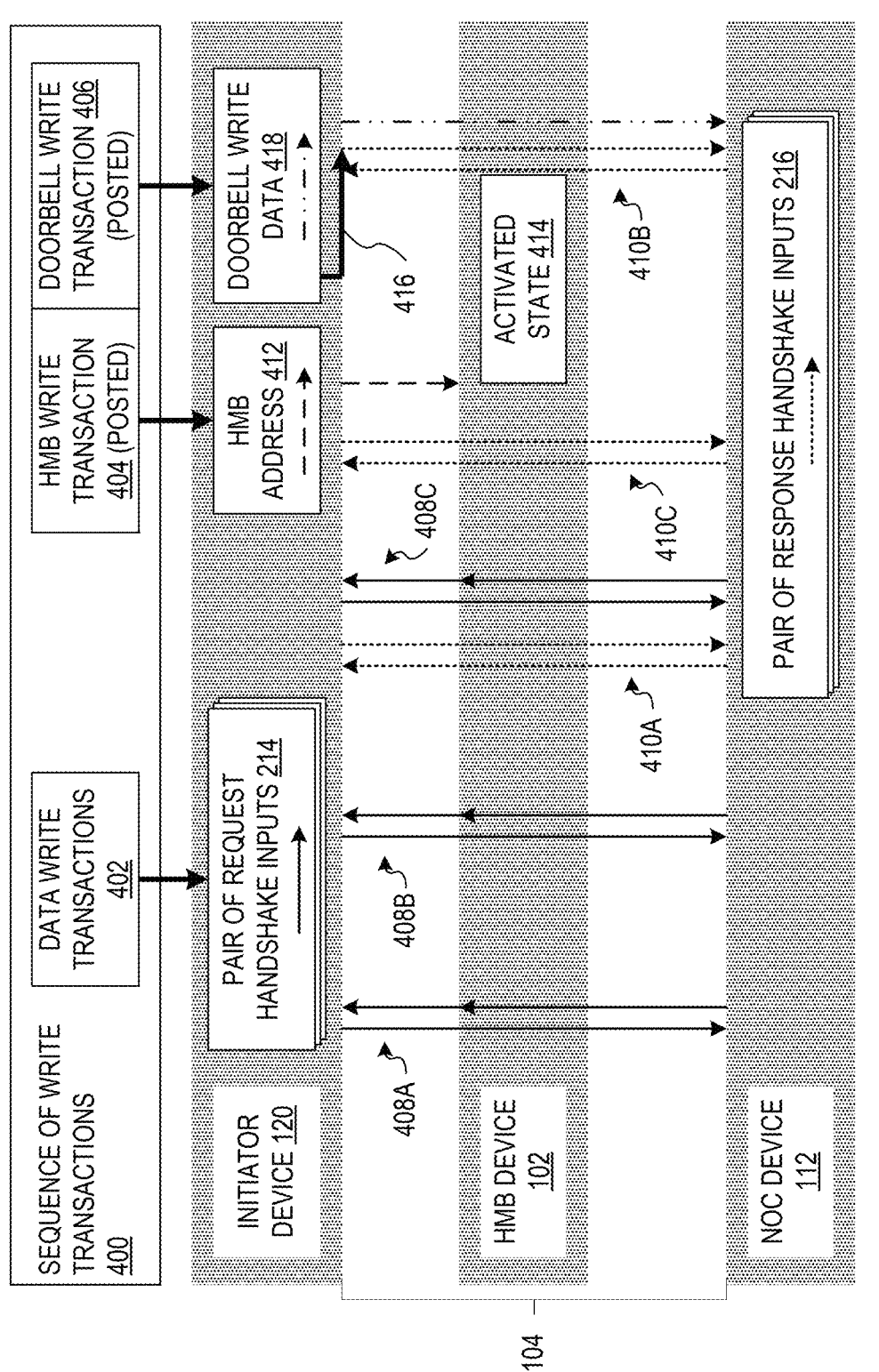
FIG. 4 schematically depicts an example write communication channel.

As previously mentioned, the HMB device 102 helps to block a doorbell write transaction at the end of a sequence of write transactions while there are outstanding transactions. FIG. 4 schematically depicts an example sequence of write transactions 400 over the write communication channel 104. For clarity, FIG. 4 depicts a subset of the inputs transmitted across the write communication channel 104 for the sequence of write transaction 400. The sequence of write transactions 400 includes a plurality of data write transactions 402 for a data transfer. As depicted, the sequence of write transactions 400 ends with an HMB write transaction 404 and a doorbell write transaction 406. Briefly, the HMB write transaction 404 activates the HMB device 102 until there are no outstanding transactions for the plurality of data write transactions 402. Then the HMB device 102 will deactivate to allow the doorbell write transaction 406 to proceed.

At the left of FIG. 4, the initiator device 120 exchanges a corresponding plurality of the pairs of request handshake inputs 214 (depicted here with solid lines 408A-C) for the plurality of data write transactions 402. In response, the NoC device 112 returns a corresponding plurality of the pairs of response handshake inputs 216 (depicted here with short-dashed lines 410A-C). One skilled in the art will recognize that additional inputs related to the plurality of data write transactions 402 is also sent across the write communication channel 104 (e.g., a write address input, write data, etc.). More particularly, a first pair of request handshake inputs 408A and a second pair of request handshake inputs 408B are exchanged between the initiator device 120 and the NoC device 112. Then, the NoC device 112 returns a corresponding first pair of response handshake inputs 410A. Subsequentially, the initiator device 120 exchanges a third pair of request handshake inputs 408C. In response, the NoC device 112 exchanges a corresponding third pair of response handshake inputs 410C.

Moving further to the right in the sequence of write transactions 400, the initiator device 120 issues the HMB write transaction 404. Here, the initiator device 120 is depicted as sending an HMB address 412 (shown here with a long-dashed line) over the write communication channel 104. The HMB device 102 detects the HMB address 412 on the write communication channel 104 and changes to an activated state 414 in response. In the activated state 414, the HMB device 102 obtains a count of outstanding transactions on the write communication channel 104, for example, from the counter module 312. In the current example, the HMB device 102 has detected the first, second, and third pairs of request handshake inputs 408A,B,C, and the corresponding first and third pairs of response handshake inputs 410A, 410C. As such, the count of outstanding transactions on the write communication channel 104 is one. Therefore, the HMB device 102 determines that the count of outstanding transactions is greater than zero and interrupts the portion of the write communication channel 104 routed through the HMB device 102.

In the current example, both the HMB write transaction 404 and the doorbell write transaction 406 are in the form of a posted write transaction. Further, the ordering rules for the write communication channel 104 state that a posted write transaction must not pass a previously issued posted write transaction. Therefore, interrupting the request handshake line 306 may prevent the initiator device 120 from issuing the doorbell write transaction 406. At 416, the initiator device 120 queues the doorbell write transaction 406.

Moving further towards the right of FIG. 4, the NoC device 112 returns a corresponding second pair of response handshake inputs 410B. This results in the count of outstanding transaction to be updated to zero. In response, the HMB device 102 changes to a deactivated state and stops interrupting the portion of the write communication channel 104 routed through the HMB device 102. Here, the ordering rules now permit the initiator device 120 to issue the doorbell write transaction 406, depicted here as doorbell write data 418 transmitted (shown here with a dash-dotted line) across the write communication channel 104.

Thus, the HMB device 102 acts as a memory barrier between the HMB write transaction 404 and the doorbell write transaction 406. Such a configuration helps to enforce that the doorbell write transaction 406 occurs at the end of the sequence of write transactions 400 while also complying with the ordering rules for the write communication channel 104. While depicted here with a single doorbell on a single write communication channel, one or more HMB devices can be connected to corresponding one or more suitable write communication channels connected to an initiator device for multiple streams of data in other examples. FIG. 4 is illustrative. In further examples, an HMB device may at least partially interrupt another suitable write communication channel in a manner that complies with ordering rules for the write communication channel.

Figure 5:
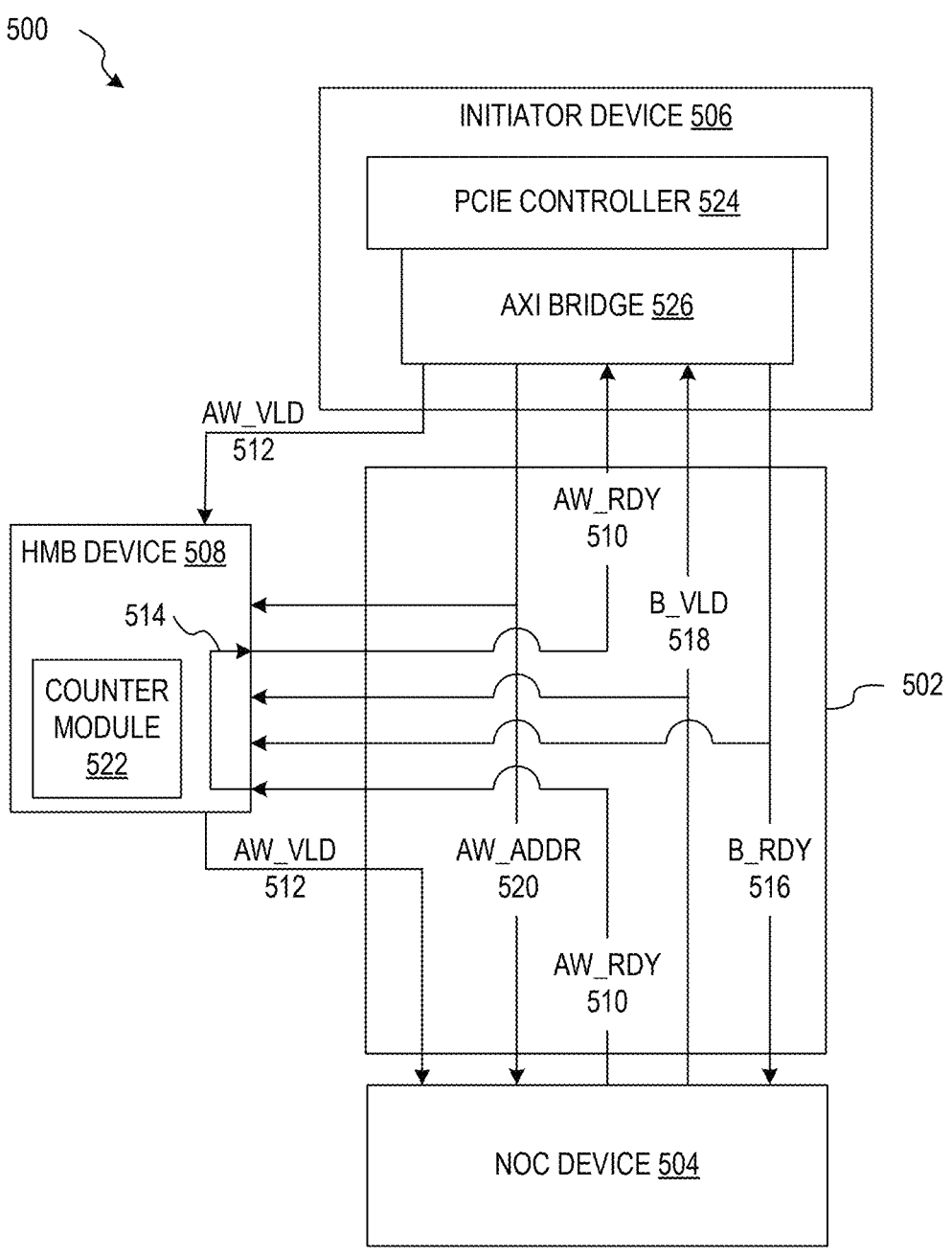
FIG. 5 schematically depicts an example computing device comprising an AXI (Advanced eXtensible Interface) write communication channel.

As previously mentioned, a write communication channel can be configured differently for different on-chip communication protocols. One example of an on-chip communication protocol is an AXI protocol. FIG. 5 schematically depicts an example computing device 500 comprising such an AXI write communication channel 502. Similar to the computing device 100, the computing device 500 also comprises a NoC device 504 and an initiator device 506 connected to the AXI write communication channel 502. Further, an HMB device 508 is connected to the AXI write communication channel 502 such that at least a portion is routed through the HMB device 508 as discussed below.

In the current example, the AXI write communication channel 502 comprises a request handshake line including a request ready line 510 (aw_rdy) and a request valid line 512 (aw_vld). Here, the request ready line 510 and the request valid line 512 can transmit, for example, the pair of request handshake inputs 214. Further, a portion of the request ready line 510 is routed through the HMB device 508 as indicated by 514. Likewise, a portion of the request valid line 512 is also routed through the HMB device 508.

Likewise, the AXI write communication channel 502 also comprises a response handshake line including a response ready line 516 (b_rdy) and a response valid line 518 (b_vld) for a pair of response handshake inputs. Additionally, the AXI write communication channel 502 comprises an address line 520 (aw_addr) that can transmit, for example, the write address input 210. In other examples, the AXI write communication channel 502 can comprise additional suitable communication lines, such as a write data line, for example.

The HMB device 508 is configured to interrupt, in an activated state, a request ready input on the request ready line 510. Specifically, the HMB device 508 is configured to interrupt the request ready input to the initiator device 506 when there are outstanding transactions on the AXI write communication channel 502 as discussed with reference to the HMB device 102. Further, the HMB device 508 comprises a counter module 522 configured to maintain a count of the outstanding transactions. Similar to the counter module 312, the counter module 522 is configured to snoop the request ready line 510, the request valid line 512, the response ready line 516, and the response valid line 518 for pairs of request handshake inputs and/or pairs of response handshake inputs. Additionally, the HMB device 508 is configured to snoop the address line 520 to detect an HMB address as discussed. In other examples, one or more of the depicted communication lines may also be routed through the HMB device 508. Further aspects of the HMB device 508 are discussed with reference to FIGS. 6A and 6B.

As depicted, the initiator device 506 includes a PCIe controller 524 for communicating with a PCIe communication domain on a processing device (not depicted in FIG. 5). The initiator device 120 also includes an AXI bridge 526 configured to exchange the write transaction(s) between the PCIe controller 524 and the AXI write communication channel 502. FIG. 5 is illustrative. In other examples, a write communication channel may have another configuration.

As discussed above, an HMB device can snoop inputs on a write communication channel for operation. FIGS. 6A and 6B illustrate a flowchart of an example method 600 for operating an HMB device connected to a write communication channel such that at least a portion of the write communication channel is routed through the HMB device. For example, the method 600 can be performed on the computing device 100 or the computing device 500. The method 600 comprises, at 602, operating the HMB device in a deactivated state in which one or more handshake inputs on the write communication channel transit through the HMB device between a NoC device and an initiator device.

While operating in the deactivated state, the method 600 comprises receiving a first handshake input and transmitting the first handshake input to the initiator device, as indicated at 604. In some examples, the first handshake input can be from the pair of request handshake inputs 214. Additionally, the method 600 comprises, at 606A, maintaining a count of outstanding transactions using a counter module on the HMB device. Further aspects of maintaining the count of outstanding transactions are discussed with reference to FIG. 6B. The method 600 can repeat 604 and 606A for each write transaction in a sequence of write transactions. At 608, the method 600 comprises changing the HMB device to an activated state in response to detecting an HMB address on the write communication channel. As such, the method 600 moves to operating, at 610, the HMB device in the activated state in which at least one handshake input is blocked from transit through the HMB device.

The method 600 further comprises, at 612, receiving a second handshake input while operating in the activated state. In some examples, the second handshake input may be from the pair of request handshake inputs 214. In such examples, receiving the second handshake input comprises receiving a request ready input from the NoC device as indicated at 614. Here, the counter module on the HMB device is still maintaining the count of outstanding transactions, as indicated at 606B.

The method 600 additionally comprises, at 616, interrupting transmission of the second handshake input to the initiator device. This helps to prevent the initiator device from issuing a subsequent write transaction, e.g., a doorbell write transaction, as discussed. In some examples, interrupting the transmission of the second handshake input to the initiator device can comprise determining that the count of outstanding transactions is greater than zero as indicated at 618. Such a configuration blocks the second handshake input from transit when there are outstanding transactions on the write communication channel and thereby queueing the doorbell write transaction at the initiator device. Alternatively or additionally, interrupting the transmission of the second handshake input to the initiator device comprises sending a de-asserted request ready input to the initiator device as indicated at 620.

The method 600 comprises, at 622, changing the HMB device to the deactivated state, to thereby return to operating, at 602, in the deactivated state. In some examples, the HMB device can change to the deactivated state in response to determining that the count of outstanding transactions is zero, as indicated at 624. Alternatively or additionally, the method 600 comprises, at 626, sending an asserted request ready input to the initiator device when changing the HMB device from the activated state to the deactivated state. This can inform the initiator device that the NoC device is ready again for write transaction(s). Thus, an HMB device configured to perform the method 600 can block a doorbell write transaction while there are outstanding transactions on a write communication channel connected to the HMB device.

Referring next to FIG. 6B, maintaining the count of outstanding transactions at 606A of FIG. 6A comprises incrementing the count of outstanding transactions based upon detecting a pair of request handshake inputs on the write communication channel, as indicated at 628. In some examples, detecting the pair of request handshake inputs can comprise detecting a request ready input from the NoC device and a request valid input from the initiator device. Likewise, maintaining the count of outstanding transactions at 606A and/or 606B of FIG. 6A comprises decrementing the count of outstanding transactions based upon detecting a pair of response handshake inputs on the write communication channel as indicated at 630. For example, the pair of response handshake inputs can comprise a response ready input and a response valid input. Thus, an HMB device configured to perform the method 600 provides a hardware memory barrier for a doorbell write transaction on a write communication channel.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
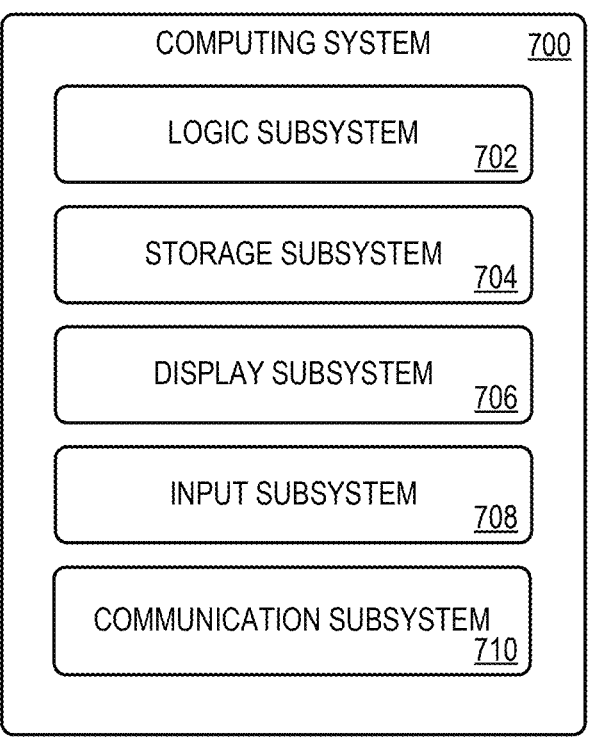
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include a display subsystem 706, input subsystem 708, communication subsystem 710, and/or other components not shown in FIG. 7. The computing device 100 and the computing device 500 are examples of the computing system 700.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data. The multi-channel memory device 108 is an example of the storage subsystem 704.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing device, comprising a write communication channel, an initiator device connected to the write communication channel and having ordering rules for the write communication channel, a network on a chip (NoC) device including a reorder buffer, the NoC device connected to the write communication channel, and a hardware memory barrier (HMB) device connected to the write communication channel such that at least a portion of the write communication channel is routed through the HMB device. In some such examples, the portion of the write communication channel routed through the HMB device includes a request ready line from the NoC device to the initiator device. Alternatively or additionally, in some such examples, the HMB device includes a counter module connected to a request handshake line and a response handshake line of the write communication channel. Alternatively or additionally, in some such examples, the HMB device is configured to change to an activated state in response to detecting an HMB address on the write communication channel. Alternatively or additionally, in some such examples, the computing device further comprises a multi-channel memory device connected to an output of the reorder buffer. Alternatively or additionally, in some such examples, the initiator device includes an Advanced eXtensible Interface (AXI) bridge.

Another example provides a method for operating a hardware memory barrier (HMB) device connected to a write communication channel such that at least a portion of the write communication channel is routed through the HMB device. The method comprises operating in a deactivated state in which one or more handshake inputs transit through the HMB device between a network on a chip (NoC) device and an initiator device; receiving, while operating in the deactivated state, a first handshake input and transmitting the first handshake input to the initiator device; changing the HMB device to an activated state, in which at least one handshake input is blocked from transit through the HMB device, in response to detecting an HMB address on the write communication channel; and receiving, while operating in the activated state, a second handshake input and interrupting transmission of the second handshake input to the initiator device. In some such examples, receiving the second handshake input comprises receiving a request ready input from the NoC device. Alternatively or additionally, in some such examples, interrupting the transmission of the second handshake input to the initiator device comprises sending a de-asserted request ready input to the initiator device. Alternatively or additionally, in some such examples, the method further comprises sending an asserted request ready input to the initiator device when changing the HMB device from the activated state to the deactivated state. Alternatively or additionally, in some such examples, the method further comprises maintaining a count of outstanding transactions using a counter module on the HMB device. Alternatively or additionally, in some such examples, maintaining the count of outstanding transactions comprises incrementing the count of outstanding transactions based upon detecting a pair of request handshake inputs on the write communication channel. Alternatively or additionally, in some such examples, maintaining the count of outstanding transactions comprises decrementing the count of outstanding transactions based upon detecting a pair of response handshake inputs on the write communication channel. Alternatively or additionally, in some such examples, interrupting the transmission of the second handshake input to the initiator device comprises determining that the count of outstanding transactions is greater than zero. Alternatively or additionally, in some such examples, the method further comprises, while operating in the activated state, changing the HMB device to the deactivated state in response to determining that the count of outstanding transactions is zero.

Another example provides a computing device, comprising a write communication channel including a request handshake line and a response handshake line; an initiator device connected to the write communication channel and having ordering rules for the write communication channel; a network on a chip (NoC) device including a reorder buffer, the NoC device connected to the write communication channel; a hardware memory barrier (HMB) device connected to the write communication channel such that at least a portion of the request handshake line is routed through the HMB device, the HMB device including a counter module connected to the request handshake line and the response handshake line; and a multi-channel memory device connected to an output of the reorder buffer. In some such examples, the initiator device includes an Advanced eXtensible Interface (AXI) bridge. Alternatively or additionally, in some such examples, the portion of the request handshake line routed through the HMB device includes a request ready line from the NoC device to the initiator device. Alternatively or additionally, in some such examples, the counter module is configured to increment a count of outstanding transactions based upon detecting a pair of request handshake inputs on the request handshake line. Alternatively or additionally, in some such examples, the counter module is configured to decrement a count of outstanding transactions based upon detecting a pair of response handshake inputs on the response handshake line.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a write communication channel;
an initiator device connected to the write communication channel and having ordering rules for the write communication channel;
a network on a chip (NoC) device including a reorder buffer, the NoC device connected to the write communication channel; and
a hardware memory barrier (HMB) device connected to the write communication channel such that at least a portion of the write communication channel is routed through the HMB device.

2. The computing device of claim 1, wherein the portion of the write communication channel routed through the HMB device includes a request ready line from the NoC device to the initiator device.

3. The computing device of claim 1, wherein the HMB device includes a counter module connected to a request handshake line and a response handshake line of the write communication channel.

4. The computing device of claim 1, wherein the HMB device is configured to change to an activated state in response to detecting an HMB address on the write communication channel.

5. The computing device of claim 1, further comprising a multi-channel memory device connected to an output of the reorder buffer.

6. The computing device of claim 1, wherein the initiator device includes an Advanced eXtensible Interface (AXI) bridge.

7. A method for operating a hardware memory barrier (HMB) device connected to a write communication channel such that at least a portion of the write communication channel is routed through the HMB device, the method comprising:
operating in a deactivated state in which one or more handshake inputs transit through the HMB device between a network on a chip (NoC) device and an initiator device;
receiving, while operating in the deactivated state, a first handshake input and transmitting the first handshake input to the initiator device;
changing the HMB device to an activated state, in which at least one handshake input is blocked from transit through the HMB device, in response to detecting an HMB address on the write communication channel; and
receiving, while operating in the activated state, a second handshake input and interrupting transmission of the second handshake input to the initiator device.

8. The method of claim 7, wherein receiving the second handshake input comprises receiving a request ready input from the NoC device.

9. The method of claim 8, wherein interrupting the transmission of the second handshake input to the initiator device comprises sending a de-asserted request ready input to the initiator device.

10. The method of claim 9, further comprising sending an asserted request ready input to the initiator device when changing the HMB device from the activated state to the deactivated state.

11. The method of claim 7, further comprising maintaining a count of outstanding transactions using a counter module on the HMB device.

12. The method of claim 11, wherein maintaining the count of outstanding transactions comprises incrementing the count of outstanding transactions based upon detecting a pair of request handshake inputs on the write communication channel.

13. The method of claim 11, wherein maintaining the count of outstanding transactions comprises decrementing the count of outstanding transactions based upon detecting a pair of response handshake inputs on the write communication channel.

14. The method of claim 11, wherein interrupting the transmission of the second handshake input to the initiator device comprises determining that the count of outstanding transactions is greater than zero.

15. The method of claim 11, further comprising, while operating in the activated state, changing the HMB device to the deactivated state in response to determining that the count of outstanding transactions is zero.

16. A computing device, comprising:

a write communication channel including a request handshake line and a response handshake line;

an initiator device connected to the write communication channel and having ordering rules for the write communication channel;

a network on a chip (NoC) device including a reorder buffer, the NoC device connected to the write communication channel;

a hardware memory barrier (HMB) device connected to the write communication channel such that at least a portion of the request handshake line is routed through the HMB device, the HMB device including a counter module connected to the request handshake line and the response handshake line; and a multi-channel memory device connected to an output of the reorder buffer.

17. The computing device of claim 16, wherein the initiator device includes an Advanced eXtensible Interface (AXI) bridge.

18. The computing device of claim 16, wherein the portion of the request handshake line routed through the HMB device includes a request ready line from the NoC device to the initiator device.

19. The computing device of claim 18, wherein the counter module is configured to increment a count of outstanding transactions based upon detecting a pair of request handshake inputs on the request handshake line.

20. The computing device of claim 18, wherein the counter module is configured to decrement a count of outstanding transactions based upon detecting a pair of response handshake inputs on the response handshake line.

* * * * *